(12) United States Patent
Sheridan

(10) Patent No.: US 9,830,460 B2
(45) Date of Patent: *Nov. 28, 2017

(54) TECHNIQUES FOR CORRELATING VULNERABILITIES ACROSS AN EVOLVING CODEBASE

(71) Applicant: WHITEHAT SECURITY, INC., Santa Clara, CA (US)

(72) Inventor: Eric Sheridan, Summerfield, NC (US)

(73) Assignee: WHITEHAT SECURITY, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,595

(22) Filed: Jul. 28, 2016

(65) Prior Publication Data

US 2017/0053121 A1    Feb. 23, 2017

Related U.S. Application Data

(63) Continuation of application No. 13/830,312, filed on Mar. 14, 2013, now Pat. No. 9,405,915.

(51) Int. Cl.
*G06F 21/57* (2013.01)
*G06F 21/56* (2013.01)

(52) U.S. Cl.
CPC .......... *G06F 21/577* (2013.01); *G06F 21/563* (2013.01); *G06F 21/564* (2013.01)

(58) Field of Classification Search
CPC ..... G06F 21/577; G06F 21/564; G06F 21/563
USPC ....................................................... 726/25
See application file for complete search history.

(56) References Cited

U.S. PATENT DOCUMENTS

| | | | |
|---|---|---|---|
| 6,279,113 B1 | 8/2001 | Vaidya | |
| 9,086,917 B1* | 7/2015 | Fitzgerald | G06F 8/60 |
| 9,405,915 B2* | 8/2016 | Sheridan | G06F 21/577 |
| 2001/0027389 A1 | 10/2001 | Beverina et al. | |
| 2005/0091542 A1* | 4/2005 | Banzhof | G06F 21/577 726/4 |
| 2007/0234304 A1 | 10/2007 | Berg et al. | |
| 2009/0144827 A1 | 6/2009 | Peinado et al. | |
| 2009/0328011 A1 | 12/2009 | Lifliand et al. | |
| 2010/0175132 A1 | 7/2010 | Zawadowskiy et al. | |
| 2010/0325620 A1 | 12/2010 | Rohde et al. | |
| 2012/0011493 A1 | 1/2012 | Singh et al. | |

(Continued)

OTHER PUBLICATIONS

Brumley D et al: "Theory and Techniques for Automatic Generation of Vulnerability-Based Signatures", IEEE Transactions on Dependable and Secure Computing, IEEE Service Center, New York, NY, US, vol. 5, No. 4, Sep. 12, 2008 (Sep. 12, 2008), pp. 224-241.

(Continued)

*Primary Examiner* — William Powers
*Assistant Examiner* — Aubrey Wyszynski
(74) *Attorney, Agent, or Firm* — Polsinelli PC

(57) ABSTRACT

Methods, apparatus, and systems for characterizing vulnerabilities of an application source code are disclosed. Steps for characterizing vulnerabilities include traversing a representation of the application source code, generating a signature of a potential vulnerability of the application source code, and determining characteristics of the potential vulnerability based on a correlation between the generated signature of the potential vulnerability and previously stored signatures of potential vulnerabilities.

20 Claims, 9 Drawing Sheets

(56) References Cited

U.S. PATENT DOCUMENTS

| | | |
|---|---|---|
| 2012/0222123 A1 | 8/2012 | Williams et al. |
| 2013/0160133 A1* | 6/2013 | Avgerinos ............... G06F 21/57 726/26 |
| 2014/0165203 A1 | 6/2014 | Friedrichs et al. |
| 2015/0067839 A1 | 3/2015 | Wardman et al. |

OTHER PUBLICATIONS

David Brumley et al: "Creating Vulnerability Signatures Using Weakest Preconditions", Computer Security Foundations Symposium, 2007. CSF '07. 20th IEEE, IEEE, PI, Jul. 6, 2007 (Jul. 6, 2007), pp. 311-325.

Gegick.: "Analyzing Security Attacks to Generate Signatures from Vulnerable Architectural Patterns", Aug. 24, 2004 (Aug. 24, 2004), Retrieved from the Internet: URL:http://repository.lib.ncsu.edu/ir/bitstream/1840.16/1923/1/etd.pdf [retrieved on Jul. 1, 2016].

Extended European Search Report dated Oct. 13, 2016 in related EP Application No. 14773337.2, filed Mar. 5, 2014, titled, "Techniques for Correlating Vulnerabilities Across an Evolving Codebase," to Whitehat Security, Inc., 7 pages.

PCT/US2014/020811; Notification of Transmittal of the International Search Report and the Written Opinion of the International Searching Authority, or the Declaration, dated Aug. 12, 2014, 9 pages.

\* cited by examiner

```
1   package com.company.servlets;
2
4   import javax.servlet.*;
4   import javax.servlet.http.*;
5
6   import java.sql.*;
7
8   public class SqlHttpServlet extends HttpServlet {
9
10      public void doGet(HttpServletRequest request, HttpServletResponse
        response) {
11
12          String action = request.getParameter("action");
13          String account = request.getParameter("account");
14
15          if("view".equals(action)) {
16              String sql = "SELECT * FROM ACCOUNTS WHERE ID='" +
                account + "'";
17              Statement statement =
                getDatabaseConnection().createStatement(sql);
18
19              displayResults(statement.execute());
20          } else {
21              /** unsupported action **/
22          }
23
24          /** record access **/
25          String sql = "UPDATE ACCESS_LOG SET ... WHERE ACCOUNT_ID='"
            + account + "'";
26          Statement statement =
            getDatabaseConnection().createStatement(sql);
27          statement.executeUpdate();
28      }
29
30  }
```

FIG. 8

TECHNIQUES FOR CORRELATING VULNERABILITIES ACROSS AN EVOLVING CODEBASE

CROSS-REFERENCE TO RELATED APPLICATIONS

This application is a continuation of U.S. patent application Ser. No. 13/830,312, entitled "TECHNIQUES FOR CORRELATING VULNERABILITIES ACROSS AN EVOLVING CODEBASE", filed on Mar. 14, 2013, which is hereby expressly incorporated herein by reference in its entirety.

BACKGROUND

Embodiments of the present invention relate to software testing and in particular static code analysis.

In static code analysis, a software application is tested without actually executing the application. The software application is typically tested by processing and analyzing the source code of the application prior to compiling the code. The entire source code of the application, or only portions of the source code, may be analyzed. The source code may be analyzed to identify vulnerabilities in the application, where vulnerabilities may include bugs, security breaches, violations of programming conventions, etc.

It is becoming increasingly common for software developers to generate (and typically release to the public) updates to software applications after the initial release of the application. Although the source code of the initially released application may be tested for vulnerabilities, it is often similarly desirable to test the updated software applications for vulnerabilities. The updated software applications typically have much source code in common with the initial release of the application. Accordingly, when potential vulnerabilities are not addressed in the initial release, they are identified during a test of not only the initial release but also the updated release of the software application. In some situations, such as when a potential vulnerability is not a real vulnerability, the redundant identification of potential vulnerabilities is problematic as it creates additional burdens on the tester reviewing the identified potential vulnerabilities.

BRIEF SUMMARY

Embodiments of the present invention may address one of more of these deficiencies. In one embodiment, a method of characterizing vulnerabilities of an application source code is disclosed. The method includes traversing a representation of the application source code and generating a signature of a potential vulnerability of the application source code. The method also includes determining characteristics of the potential vulnerability based on a correlation between the generated signature of the potential vulnerability and previously stored signatures of potential vulnerabilities.

In at least one embodiment, generating a signature of a potential vulnerability of the application source code includes various steps. For example, it may include identifying a potential vulnerability in the application source, collecting metadata of a node associated with the vulnerability, and generating a signature of the potential vulnerability using the collected metadata. In some embodiments, generating a signature may also include determining whether the potential vulnerability is associated with more than one node, and when it is determined that the potential vulnerability is associated with more than one node, identifying a preferred node of the more than one node.

In some embodiments, collecting contextually significant information may include a variety of steps. For example, it may include determining whether the node has a resolved symbol, and when it is determined that the node has a resolved symbol, collecting the corresponding qualified signature. Further, when it is determined that the node does not have a resolved symbol, the name of the node type may be collected if the node influences control flow of the application.

In at least one embodiment, determining characteristics of the potential vulnerability may include a variety of steps. For example, it may include determining whether the generated signature matches any previously stored signatures of potential vulnerabilities. When it is determined that the generated signature matches a previously stored signature, the potential vulnerability may be characterized as having the generated signature as a duplicate. When it is determined that the generated signature does not match a previously stored signature, the potential vulnerability the potential vulnerability may be characterized as having the generated signature as a new vulnerability.

Embodiments are also directed to a computing system. The computing system may comprise a number of elements, such as a storage element operable to store a representation of an application source code, and a processor operable to perform a variety of operations. The operations may include: traversing the representation of the application source code, generating a signature of a potential vulnerability of the application source code, and determining characteristics of the potential vulnerability based on a correlation between the generated signature of the potential vulnerability and previously stored signatures of potential vulnerabilities.

Embodiments are also directed to a tangible non-transitory computer readable storage medium having code stored thereon that, when executed by a computer, causes the computer to perform various operations. The various operations may include: traversing a representation of an application source code, generating a signature of a potential vulnerability of the application source code, and determining characteristics of the potential vulnerability based on a correlation between the generated signature of the potential vulnerability and previously stored signatures of potential vulnerabilities.

Additional embodiments and features are set forth within the description that follows, and in part will become apparent to those skilled in the art upon examination of the specification, or may be learned by the practice of the disclosed embodiments. The features and advantages of the disclosed technology may be realized and attained by means of the instrumentalities, combinations, and methods described in the specification.

BRIEF DESCRIPTION OF THE FIGURES

FIG. 8 is an example code snippet of code vulnerable to SQL injection.

DETAILED DESCRIPTION

Figure 1:
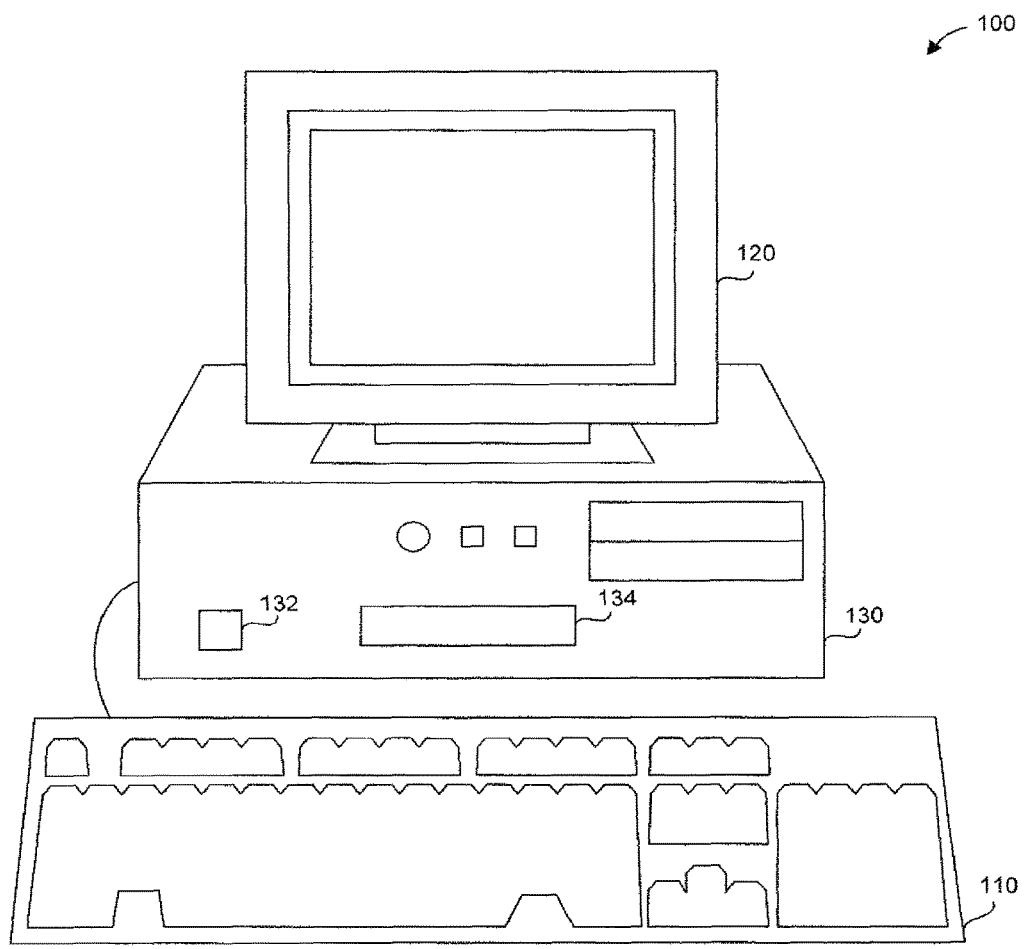
FIG. 1 is a block diagram illustrating a computer system according to embodiments of the present invention.

Embodiments of the present invention include apparatus, systems and methods for correlating the same vulnerability across an evolving codebase through the use of contextual information in the abstract syntax tree thereby reducing the number of duplicate vulnerabilities produced by a scan.

Some of the techniques described herein provide a static code analysis (SCA) engine that has the ability to correlate the same vulnerability across an evolving codebase, thereby reducing the number of duplicate vulnerabilities produced by a scan. Correlation of the same vulnerability across multiple scans of an evolving codebase may be achieved through the use of contextual analysis of the vulnerability as it exists in an abstract syntax tree (AST).

The SCA engine first models application source code into an AST structure. The AST structure is then analyzed various ways for security vulnerabilities. The vulnerabilities identified in the AST can be associated with one or more AST nodes (henceforth "vulnerability AST node"). For the purpose of performing correlation, the SCA engine selects the AST node that most correctly reflects the vulnerability in the application. For vulnerabilities containing two or more AST nodes, the SCA engine selects the last-most AST node. Given the vulnerability AST node, the SCA engine collects various meta-data about that node. If the AST node has a resolved symbol (e.g., resolved information about a variable declaration, variable usage, method invocation, method declaration, class declaration, etc.), then the SCA engine collects the corresponding qualified signature. If the AST node does not have a resolved symbol but is known to influence the control flow of the application, then the SCA engine simply collects the name of the AST node type. This meta-data collection occurs not only for the given vulnerability AST node, but for all the parents of the vulnerability AST node. When there is no longer any parent to scan (i.e., the SCA engine hits the root of the AST), then the SCA engine generates a hash of all the collected meta-data. This resulting hash of meta-data represents the unique signature of the vulnerability. This unique signature is generated using contextual information that will persist over the lifetime of the application unless the codebase containing the vulnerability dramatically changes. All unique vulnerability signatures produced by a scan are saved and used for comparison when the same application is re-scanned.

When the SCA engine re-scans the application, it will produce vulnerabilities and calculate corresponding unique vulnerability signatures. Signatures produced from the new scan are compared to signatures produced from the previous scan. If a unique signature in the current scan is found in the set of signatures from the previous scan, then the SCA engine considers the corresponding vulnerability a duplicate. If a unique signature in the current scan is not found in the previous scan, then the SCA engine determines that a new vulnerability is present. If a unique signature in the previous scan is not found in the current scan, then the SCA engine determines that the vulnerability is no longer present (i.e., the vulnerability has been fixed or removed).

Turning now to the figures, FIG. 1 is a block diagram illustrating a computer system 100 according to embodiments of the present invention. Computer system 100 may be any suitable electronic computing device, such as a desktop computer, a laptop computer, a network server, a note pad, a mobile phone, a personal digital assistant (PDA), a handheld or portable device (iPhone™, Blackberry, etc.), or other electronic device. Computer system 100 may be associated with a user having a desire to perform static code analysis on source code stored at the computer system 100 or remote from computer system 100.

Computer system 100 may include any suitable components typically found in such a system necessary to perform the operations discussed herein. In one embodiment and as illustrated in FIG. 1, computer system 100 includes an input device 110, an output device 120, and a case 130, all coupled to one another.

The input device 110 may be any device suitable for receiving input from the user. In the embodiment depicted in FIG. 1, the input device 110 is a keyboard. However, in other embodiments, the input device 110 may include a mouse, a pointer, a touch-screen, a microphone, or other device suitable to receive information from a user.

The output device 120 may be any device suitable for providing information to the user. In the embodiment depicted in FIG. 1, the output device 120 is an electronic display (e.g., an liquid crystal display, a light emitting diode display, etc.). However, in other embodiments, the output device 120 may include a speaker or other device suitable for providing information to the user. In at least one embodiment, the input device 110 and the output device 120 may be integrated with one another.

The case 130 may be any suitable case for containing one or more additional elements of computer system 100, such as one or more processors 132, one or more storage elements 134, etc. The processor 132 may be any suitable computer processor operable to execute instructions stored on a medium (e.g., code representing the SCA engine), and storage element 134 may be any suitable tangible non-transitory computer readable storage medium. The storage element 134 may be operable to store application source code to be tested, representations of the source code under test, an application representing the SCA engine, etc. The storage element 134 may include, for example, one or more of random access memory (RAM), read only memory (ROM), electrically-erasable programmable read only memory (EEPROM), a hard disk, an optical disk, etc. The processor 132 may be operable to execute the application representing the SCA engine so as to test the source code under test.

In some embodiments, the application source code may be stored remotely from the computer system 100. In such cases, the application source code, in whole or in part, may be retrieved by the computer system 100 and tested by the computer system 100. For example, the computing system 100 may also include a communication interface (not shown) to facilitate wired or wireless communication with one or more other electronic devices, and may use the communication interface to acquire the source code and, in some embodiments, communicate test results.

Computer system 100 in certain embodiments is a computing environment for performing static code analysis using a number of components as depicted in FIG. 1. However, it will be appreciated by those of ordinary skill in the art that static code analysis as described herein could be performed equally well in other computing environments including computer systems having fewer or a greater number of components than are illustrated in FIG. 1. Thus, the depiction of computer system 100 in FIG. 1 should be taken as being illustrative in nature, and not limiting to the scope of the disclosure.

Figure 2:
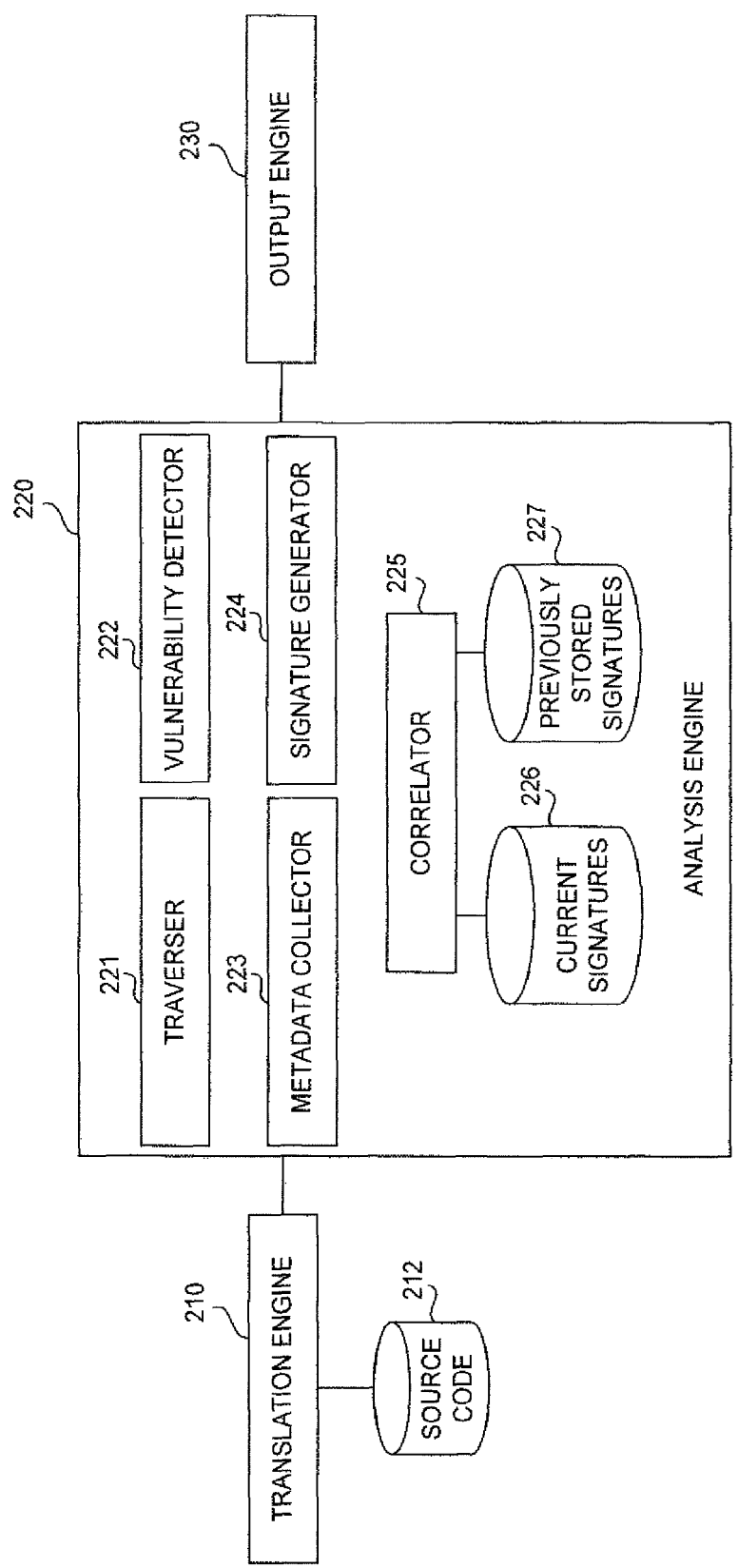
FIG. 2 illustrates various computing engines that may be used to perform static code analysis according to embodiments of the present invention.

FIG. 2 illustrates various computing engines that may be used to perform static code analysis according to embodiments of the present invention. The various engines may comprise code operable to perform various functions when executed by a processor, or may comprise hardware operable to perform various functions when activated. For example, the various engines may comprise code stored on storage element 134 (FIG. 1) that is operable to cause computer system 100 to perform various operations when executed by processor 132. In some embodiments, the various engines depicted herein may correspond to the previously described SCA engine.

A translation engine 210 is coupled to a source code depository 212. The source code depository 212 may store source code of an application under test, where the source code may represent all or only a portion of the application under test. For example, the source code depository 212 could be located in storage element 134 (FIG. 1). The translation engine may read the source code from source code depository 212 and generate a representation of the source code. For example, the translation engine may generate a representation of the abstract syntactic structure of the source code. In at least one embodiment, the translation engine may generate an abstract syntax tree (AST) of the source code.

An analysis engine 220 is coupled to the translation engine 210 and is operable to receive the representation of the source code from the translation engine 210. The analysis engine is operable to perform static code analysis on the representation of the source code. The analysis engine 220 may include one or more of a variety of components, such as a traverser 221, a vulnerability detector 222, a metadata collector 223, a signature generator 224, and a correlator 225 coupled to a current signatures repository 226 and a previously stored signatures repository 227.

The traverser 221 may be operable to traverse the representation of the source code as described herein. In traversing the representation of the source code, the traverser 222 may use one or more rules included in a rule pack (not shown). Further, the traverser 222 may use metadata provided from metadata collector 223. The traverser 222 may traverse nodes, children of nodes, parents of nodes, grandparents of nodes, etc. While traversing the nodes of the representation of the source code, the analysis engine 220 may simultaneously perform other tasks, such as detecting vulnerabilities, generating signatures, etc., as further described herein.

The vulnerability detector 222 may be operable to detect or otherwise identify vulnerabilities in the source code. Vulnerabilities may include bugs, security breaches, violations of programming conventions, etc. The vulnerability detector 222 may detect vulnerabilities while the traverser 221 traverses the representation of the source code as further described herein. Various techniques for detecting vulnerabilities are further described herein.

Metadata collector 223 may be operable to collect metadata while the traverser 221 traverses the representation of the source code. The metadata collector 223 may collect various information about one or more nodes associated with a detected vulnerability. For example, the metadata collector 223 may collect contextually significant information about child and/or parent nodes of the node associated with the detected vulnerability, as further described herein.

Signature generator 224 may be operable to generate a signature based on metadata collected by metadata collector 223. The signature generator 224 may use the collected metadata in one or more of a variety of ways so as to generate a unique signature associated with the vulnerability. For example, the signature generator 224 may apply a hash function to the metadata and use the output of the hash function as the signature. Various techniques for generating a signature are further described herein.

Correlator 225 may be operable to correlate a generated signature of a detected potential vulnerability with previously stored signatures of previously detected potential vulnerabilities. Correlating the generated signature with previously stored signatures may include comparing the signatures with one another to determine whether they are identical or are substantially similar to one another. For example, correlator 225 may store generated signatures of detected potential vulnerabilities in the current signatures repository 226, and may have previously stored signatures in repository 227. Correlator 225 may then compare the recently stored signatures with those previously stored to determine whether there are any matches. Various techniques for performing such correlations are further described herein.

The engines depicted in FIG. 2 are operable to perform static code analysis according to certain embodiments. However, it will be appreciated by those of ordinary skill in the art that static code analysis as described herein could be performed equally well using fewer or a greater number of computing engines than are illustrated in FIG. 2. Thus, the depiction of computing engines in FIG. 2 should be taken as being illustrative in nature, and not limiting to the scope of the disclosure.

Figure 3:
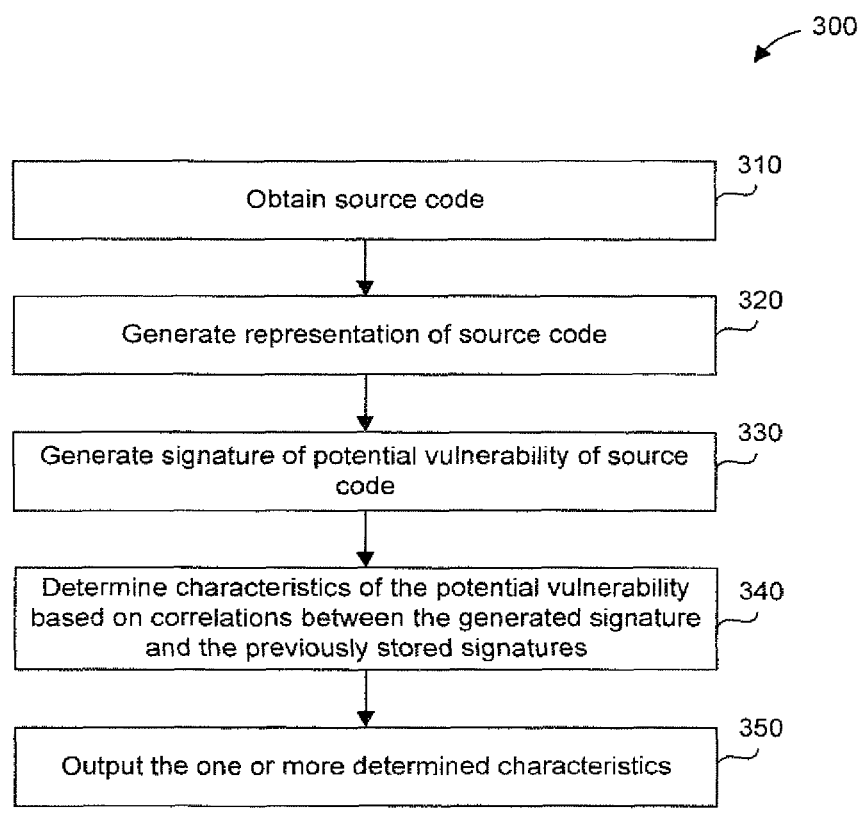
FIG. 3 is a flowchart showing a method of performing static code analysis according to embodiments of the present invention.

FIG. 3 is a flowchart showing a method 300 of performing static code analysis according to embodiments of the present invention. The method 300 may be executed by any suitable computing system, such as computing system 100 (FIG. 1), and/or one or more computational engines including those described with reference to FIG. 2.

In operation 310, the source code is obtained. The entire source code or only portions of the source code of an application to be tested may be acquired. For example, computing system 100 may receive the source code from another electronic device via wired or wireless communications. For another example, the source code may be generated at computing system 100. The source code may be stored at computing system 100, e.g., by storage element 134, and/or by source code repository 212 (FIG. 2).

In operation 320, a representation of the structure of the source code is generated. For example, translation engine 210 (FIG. 2) may generate an AST of the source code, where the AST includes various nodes to be traversed.

In operation 330, a signature of a potential vulnerability of the source code is generated. Signatures of one or more potential vulnerabilities may be generated. For example, signature generator 224 (FIG. 2) may use data provided by vulnerability detector 222 (FIG. 2) and metadata collector 223 (FIG. 2) to generate signatures of potential vulnerabilities. Various techniques for generating signatures of potential vulnerabilities are further described herein, for example with reference to FIG. 4.

In operation 340, characteristics of the potential vulnerability are determined. The characteristics are determined based on correlations between the signature(s) generated in operation 330 and one or more previously stored signatures of potential vulnerabilities. For example, signatures of potential vulnerabilities may be generated and stored for an initial source code (e.g., stored in the previously stored signatures repository 227 of FIG. 2). The initial source code may then be updated or otherwise revised to include additional or different code, resulting in a subsequent source code. During or after a scan of the subsequent source code, one or more signatures of potential vulnerabilities of the subsequent source code may be generated (and, in some embodiments, stored in the current signatures repository 226 of FIG. 2). Characteristics of the potential vulnerabilities of the subsequent source code may be determined based on correlations between the signatures of the potential vulnerabilities of the subsequent source code and the previously stored signatures of the potential vulnerabilities of the initial source code. For example, correlator 225 (FIG. 2) may determine correlations between the signatures.

Characteristics may include whether the potential vulnerabilities in the subsequent source code are new vulnerabilities or old (i.e., redundant) vulnerabilities. Characteristics may also include whether potential vulnerabilities in the initial source code no longer exist in the subsequent source code, indicating that the potential vulnerabilities have been fixed or removed. Various techniques for determining characteristics of potential vulnerabilities are further described herein.

In operation 350, one or more of the determined characteristics are output. For example, output engine 230 (FIG. 2) may output information regarding the characteristics determined in operation 350. In some embodiments, this may include identifying and outputting only newly found potential vulnerabilities, identifying and outputting only fixed or removed vulnerabilities, a combination thereof, etc. Various techniques for outputting such characteristics are further described herein.

It should be appreciated that the specific operations illustrated in FIG. 3 provide a particular method of performing static code analysis according to certain embodiments of the present invention. Other sequences of operations may also be performed according to alternative embodiments. For example, alternative embodiments of the present invention may perform the operations outlined above in a different order. Moreover, the individual operations illustrated in FIG. 3 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
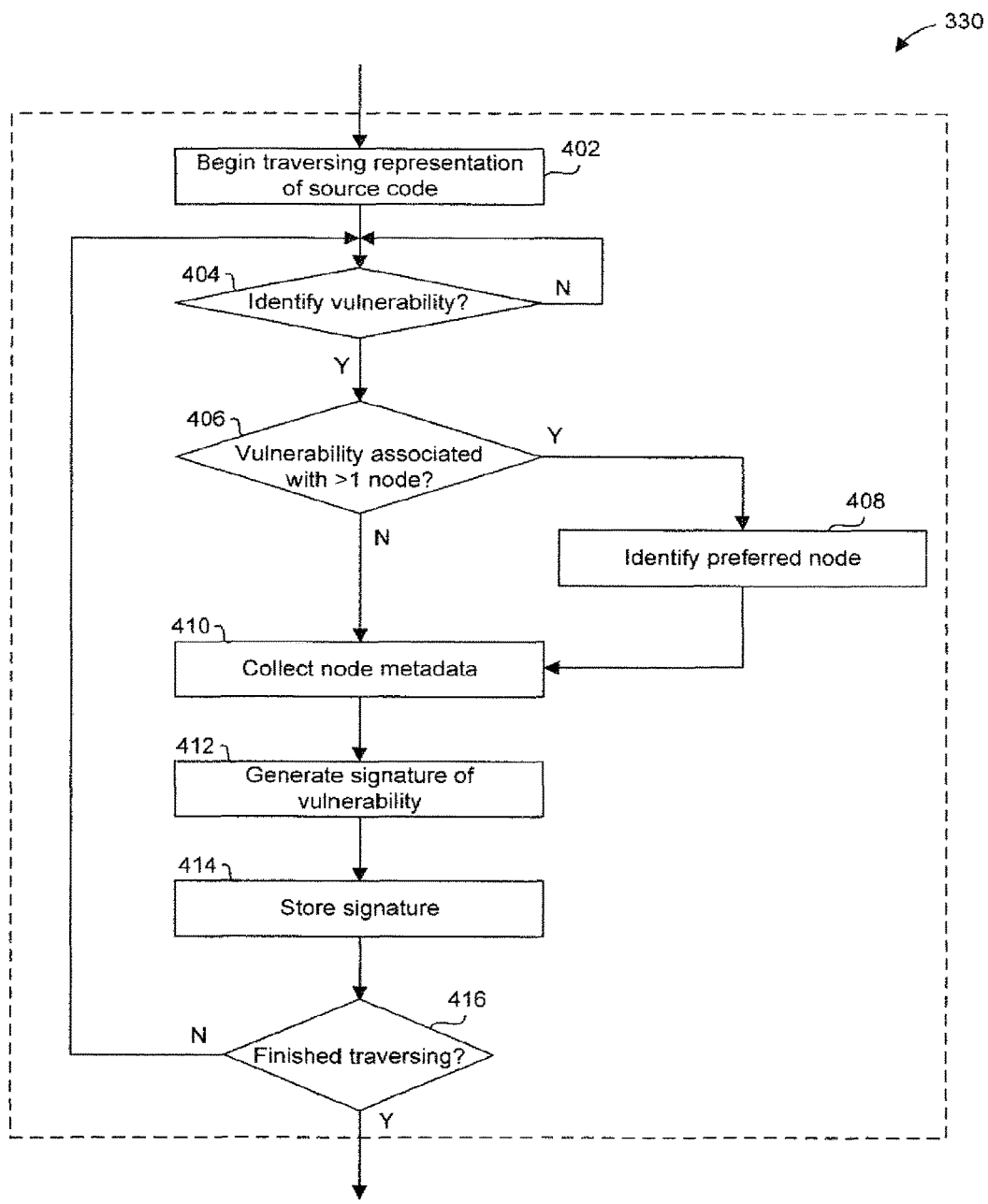
FIG. 4 is a flowchart showing operations for generating a signature of a potential vulnerability of source code as depicted in FIG. 3 according to an embodiment of the present invention.

FIG. 4 is a flowchart showing operations for generating a signature of a potential vulnerability of source code as depicted in operation 330 (FIG. 3) according to an embodiment of the present invention. The operations may be executed by any suitable computing system, such as computing system 100 (FIG. 1), and/or one or more computational engines including those described with reference to FIG. 2.

In operation 402, traversal of the representation of the source code begins. For example, traverser 221 (FIG. 2) may begin traversing the representation of source code generated by translation engine 210 (FIG. 2). In traversing the representation of source code, traverser 221 may scan the representation node-by-node, searching for potential vulnerabilities.

In operation 404, it is determined whether a vulnerability is identified. For example, vulnerability detector 222 (FIG. 2) may search for vulnerabilities in the application source code as the traverser 221 traverses the representation of the source code. If no vulnerability is detected, in some embodiments, the traverser may continue to search for vulnerabilities, whereas in other embodiments, the process may end if the traverser has finished traversing the representation of the source code.

In the event that a vulnerability is identified, processing continues to operation 406. In operation 406, it is determined whether the vulnerability is associated with more than one node. For example, vulnerability detector 222 may determine whether the identified vulnerability is associated with more than one node in the representation of the source code. If it is determined that the vulnerability is associated with only one node, then processing may continue to operation 410, where metadata about that one node is collected. If it is determined that the vulnerability is associated with more than one node, then processing may continue to operation 408.

In operation 408, a preferred node is identified. The preferred node may be that node that most correctly reflects the vulnerability in the application. This may, for example, be the last-most node, i.e., the node that signifies the final state of execution by the application which triggers the vulnerability. In other words, it represents the last step in a finite state machine at which point the vulnerability is fully realized. Once the preferred node is selected, processing continues to operation 410, where metadata about the preferred node is collected. Further techniques for collecting node metadata are described herein, for example with reference to FIG. 6.

Once metadata about a node is collected, processing continues to operation 412. In operation 412, a signature of the potential vulnerability is generated. For example, signature generator 224 (FIG. 2) may generate a signature of the potential vulnerability using the metadata collected in operation 410. The collected metadata may be used in one or more of a variety of ways to generate a unique signature associated with the vulnerability. For example, the signature generator 224 may apply a hash function to the metadata and use the output of the hash function as the signature.

Once a signature of the vulnerability is generated, the signature may be stored in operation 414. For example, the signature may be stored in the current signatures 226 repository. In some embodiments, after scanning of a first source code is complete and signatures are generated and stored, those stored signatures may be moved from the current signatures repository 226 to the previously stored signatures repository 227. Then, upon subsequently scanning a second source code, any signatures generated for the second source code may be stored in the current signatures 226 for comparison to those in the previously stored signatures repository 227.

In operation 416, it is determined whether traversing of the representation of the source code is finished. For example, traverser 221 may determine whether it has finished traversing the entire representation of source code. If not, processing may continue with operation 404. If so, processing may continue to operation 340 (FIG. 3).

It should be appreciated that the specific operations illustrated in FIG. 4 provide a particular method of generating one or more signatures of one or more potential vulnerabilities of an application source code according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5:
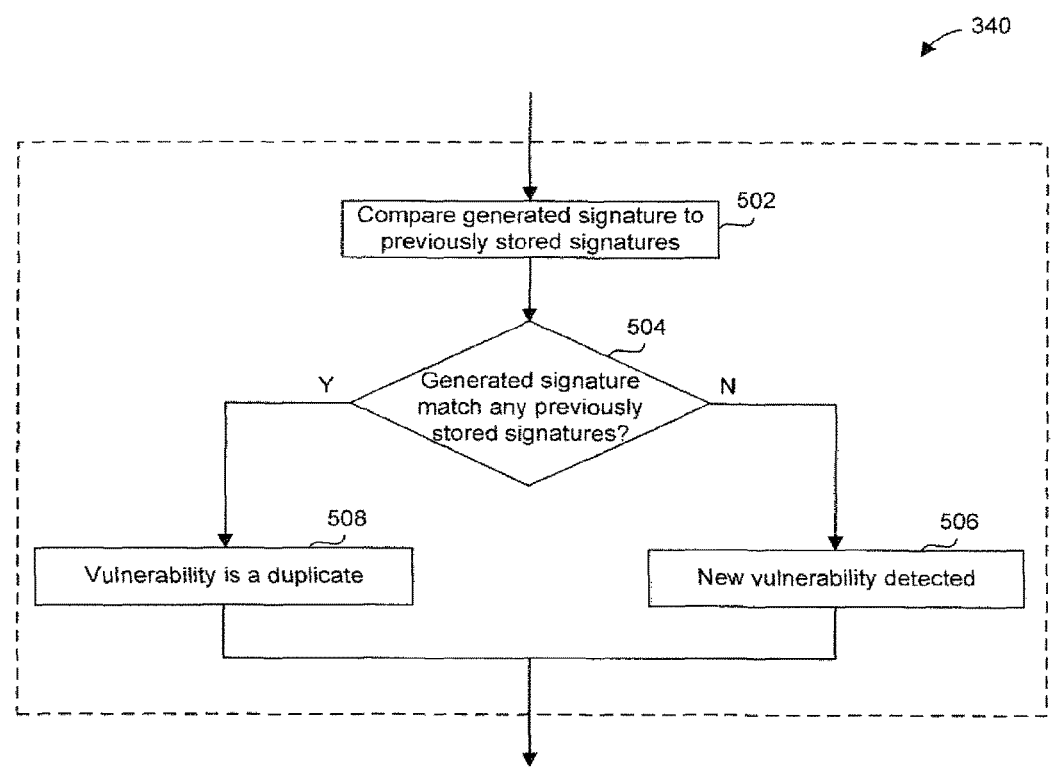
FIG. 5 is a flowchart showing operations for determining characteristics of a potential vulnerability as depicted in FIG. 3 according to an embodiment of the present invention.

FIG. 5 is a flowchart showing operations for determining characteristics of a potential vulnerability as depicted in operation 340 (FIG. 3) according to an embodiment of the present invention. The operations may be executed by any suitable computing system, such as computing system 100 (FIG. 1), and/or one or more computational engines including those described with reference to FIG. 2.

In operation 502, a generated signature is compared to previously stored signatures. For example, correlator 225 may compare one or more generated signatures (which may be stored in current signatures repository 226) with one or more previously stored signatures (which may be stored in previously stored signatures repository 227). The previously stored signatures may be signatures generated from previous iterations of the source code now under test.

In operation 504, it is determined whether the one or more generated signatures matches the one or more previously stored signatures. For example, each generated signature may be compared to all of the previously stored signatures. If the generated signature is identical to or substantially similar to at least one of the previously stored signatures, then it may be determined that the generated signature matches the previously stored signatures. If there is not a match, then processing continues to operation 506, where it is determined that a new vulnerability is detected. If there is a match, then processing continues to operation 508, where it is determined that the vulnerability is a duplicate.

While the comparison between generated and previously stored signatures is depicted as being performed after traversing of the representation of source is complete and all vulnerabilities have been identified and signatures generated, in some embodiments the comparison may be performed at other suitable times. For example, with reference to FIG. 4, the comparison may be performed at any time after generating a signature of the vulnerability (operation 412). In such cases, characteristics of generated signatures may be determined immediately after the vulnerability is detected.

Further, in at least one embodiment, each previously stored signature may be compared to generated signatures to determine whether any previously stored signatures exist for which a new signature has not been generated. If it is determined that previously stored signatures exist but there is no corresponding new signature, then it may be determined that the vulnerability associated with the previously stored generator has been fixed or removed as a result of revisions to the source code used to generate the previously stored signatures.

It should be appreciated that the specific operations illustrated in FIG. 5 provide a particular method of determining characteristics of potential vulnerabilities according to certain embodiments of the present invention. Other sequences of operations may also be performed according to alternative embodiments. For example, alternative embodiments of the present invention may perform the operations outlined above in a different order. Moreover, the individual operations illustrated in FIG. 5 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 6:
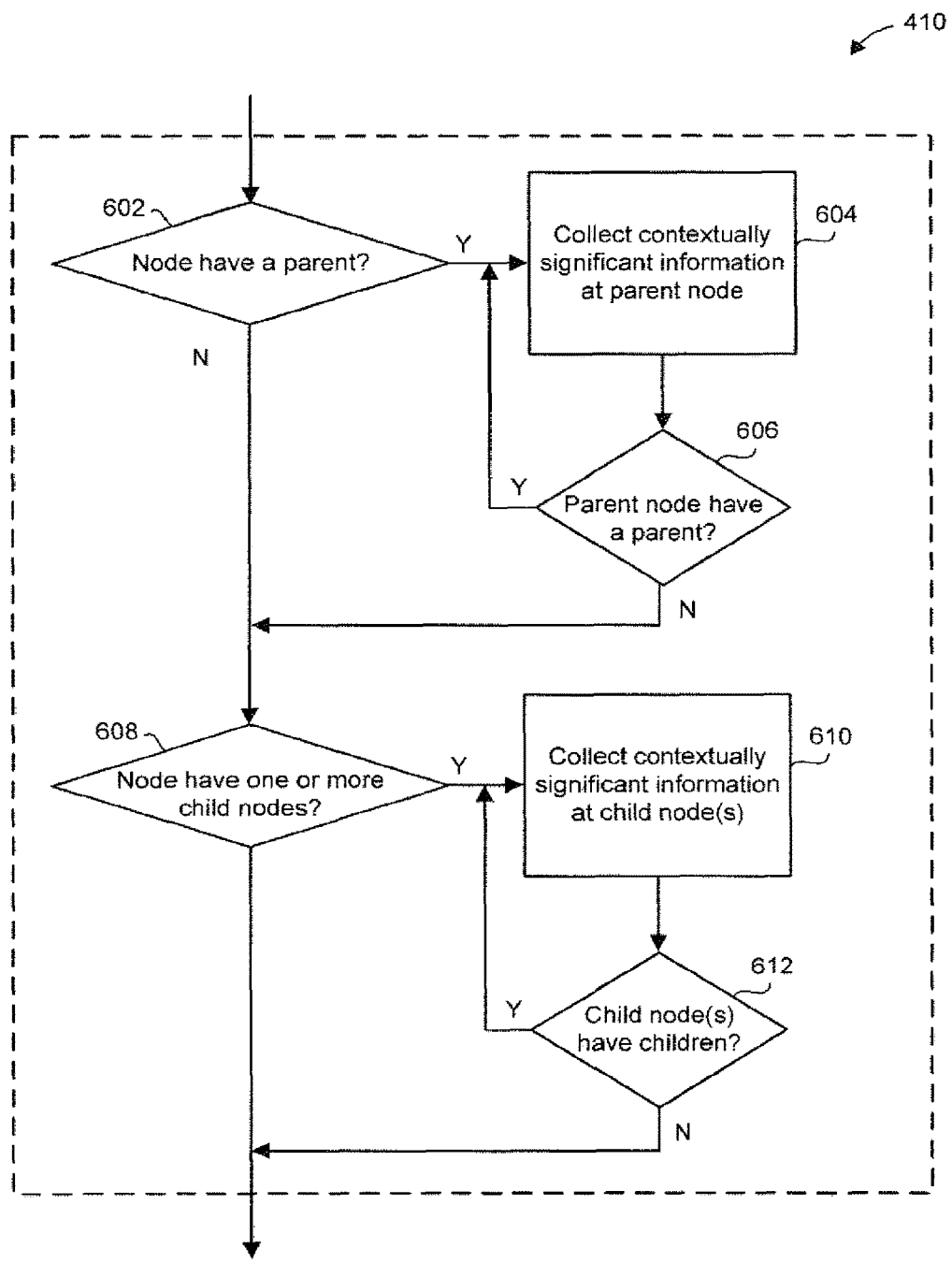
FIG. 6 is a flowchart showing operations for collecting node metadata as depicted in FIG. 4 according to an embodiment of the present invention.

FIG. 6 is a flowchart showing operations for collecting node metadata as depicted in operation 410 (FIG. 4) according to an embodiment of the present invention. The operations may be executed by any suitable computing system, such as computing system 100 (FIG. 1), and/or one or more computational engines including those described with reference to FIG. 2.

In operation 602, it is determined whether a node has a parent. For example, metadata collector 223 may determine whether a node in the representation of the source code has a parent node. If so, then processing may continue to operation 604.

In operation 604, contextually significant information at the parent node is collected. For example, metadata collector 223 may collect a qualified signature of the node, a name of the node type, etc. Further techniques for collecting contextually significant information is described herein, for example with reference to FIG. 7.

In operation 606, it is determined whether the parent node has a parent. If so, then processing may return to operation 604, and contextually significant information about the new parent may be collected. Otherwise, processing may continue to operation 608. As a result of operations 602, 604, and 606, contextually significant information about parent nodes, grandparent nodes, great-grandparent nodes, etc., can be collected. This information may subsequently be used (e.g., hashed) to generate a signature.

In operation 608, it is determined whether a node has one or more child nodes. For example, metadata collector 223 may determine whether a node in the representation of the source code has one or more child nodes. If so, then processing may continue to operation 610 for each child node.

In operation 610, contextually significant information at the child node is collected. For example, metadata collector 223 may collect a qualified signature of the node, a name of the node type, etc. Further techniques for collecting contextually significant information is described herein, for example with reference to FIG. 7.

In operation 612, it is determined whether the child node has one or more children nodes. If so, then processing may return to operation 610 for each child node, and contextually significant information about the new child node(s) may be collected. Otherwise, processing may continue to operation 412 (FIG. 4). As a result of operations 608, 610, and 612, contextually significant information about children nodes, grandchildren nodes, great-grandchildren nodes, etc., can be collected. This information may subsequently be used (e.g., hashed) to generate a signature.

In some embodiments, a node may only have parent nodes. In such cases, the contextually significant information at the parent nodes may be used to generate a signature. In other embodiments, a node may only have children nodes. In such cases, the contextually significant information at the children nodes may be used to generate a signature. In yet other embodiments, a node may have both parent and children nodes. In such cases, the contextually significant information at both the parent and children nodes may be used to generate a signature.

It should be appreciated that the specific operations illustrated in FIG. 6 provide a particular method of collecting node metadata according to certain embodiments of the present invention. Other sequences of operations may also be performed according to alternative embodiments. For example, alternative embodiments of the present invention may perform the operations outlined above in a different order. Moreover, the individual operations illustrated in FIG. 6 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 7:
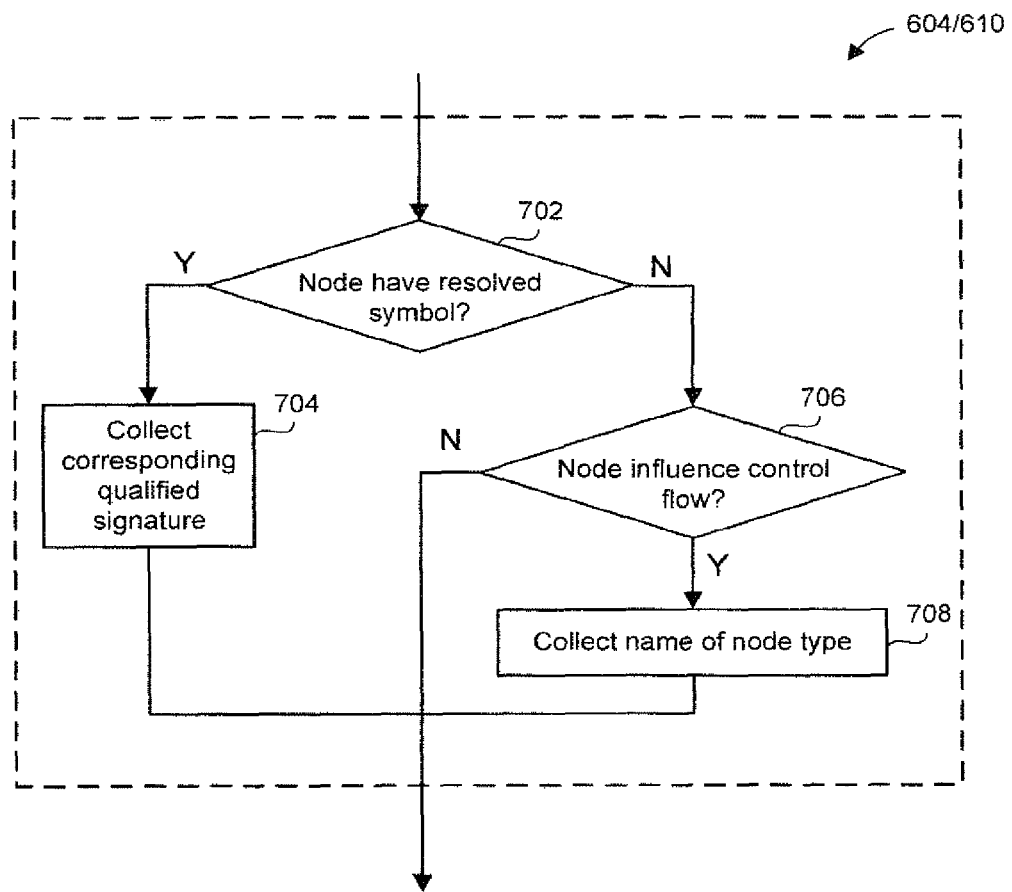
FIG. 7 is a flowchart showing operations for collecting contextually significant information as depicted in FIG. 6 according to an embodiment of the present invention.

FIG. 7 is a flowchart showing operations for collecting contextually significant information as depicted in operations 604/610 (FIG. 6) according to an embodiment of the present invention. The operations may be executed by any suitable computing system, such as computing system 100 (FIG. 1), and/or one or more computational engines including those described with reference to FIG. 2.

In operation 702, it is determined whether the node (e.g., the node associated with the identified vulnerability, one or more parents of that node, and/or one or more children of that node) has a resolved symbol. For example, the metadata collector 223 (FIG. 2) may determine whether there is resolved information about a variable declaration, variable usage, method invocation, method declaration, class declaration, etc. If so, then processing may continue to operation 704, where the qualified signature corresponding to the resolved symbol is collected and used as the contextually significant information. If not, then processing may continue to operation 706.

In operation 706, it is determined whether the node influences the control flow of the application. For example, the metadata collector 223 may determine whether the node corresponds to an if/then statement, a jump statement, etc. If so, then processing may continue to operation 708, where the name of the node type is collected and used as the contextually significant information. Otherwise, processing may continue to operation 606 (FIG. 6) or 612 (FIG. 6).

It should be appreciated that the specific operations illustrated in FIG. 7 provide a particular method of collecting contextually significant information according to certain embodiments of the present invention. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Walkthrough: Hash Calculation

The following section provides specific examples illustrating how the SCA engine may calculate the vulnerability hash in source code based on the context of the an AST node.
Code References:
  SQLInjection.java—code vulnerable to SQL injection (FIG. 8)
Description
  The SQLInjection class contains two distinct SQL injection vulnerabilities, at line 19 and 27 respectively. We will walk through operations performed by the SCA engine to produce a hash for both of these vulnerabilities starting at line 19. The SCA engine visits the parents and the children of the vulnerability AST node looking for contextually significant AST nodes. Contextually significant AST nodes at a minimum include: method declarations, variable declarations, class declarations, method invocations, and any other AST node that results in code branching (e.g., an "if" statement).

The method invocation at line 19, statementexecute( ), is considered our vulnerability and is referred to as our "vulnerability AST node". The first thing the SCA engine does is visit the immediate children of this AST node to determine if they contain any contextually significant information. Given that the method invocation has no arguments, it has no children and thus there is no information of interest. The engine will then start visiting the current vulnerability AST node and all parents collecting information of interest. When traversing to the parent the SCA engine collects the following information many of which are fully qualified symbols of expressions:

statement.execute( )—java.sql.Statement.execute( )
  if("view".equals(action))—class name of code branching statement public void doGet—com.company.servlets.SqlHttpServlet.doGet(javax.servlet.http.HttpServletRequest, javax.servlet.http.HttpServletResponse)
  public class SqlHttpServlet—com.company.servlets.SqlHttpServlet All of this information is then hashed together and represents the vulnerability signature. If a subsequent scan matches the hash value, then the SCA engine has high confidence that it is dealing with the same vulnerability in the same contextually similar location in code.

The method invocation at line 27, statement.executeUpdate( ), is also considered our vulnerability and is in fact referred to as our "vulnerability AST node". The first thing the SCA engine does is visit the immediate children of this AST node to determine if they contain any contextually significant information. Given that the method invocation has no arguments, it has no children and thus there is no information of interest. The engine will then start visiting the current vulnerability AST node and all parents collecting information of interest. When traversing to the parent the SCA engine collects the following information many of which are fully qualified symbols of expressions:

statement.executeUpdate( )—java.sql.Statement.executeUpdate( )
  public void doGet—com.company.servlets.SqlHttpServlet.doGet(javax.servlet.http.HttpServletRequest, javax.servlet.http.HttpServletResponse)
  public class SqlHttpServlet—com.company.servlets.SqlHttpServlet All of this information is then hashed together and represents the vulnerability signature. If a subsequent scan matches the hash value, then the SCA engine has high confidence that it is dealing with the same vulnerability in the same contextually similar location in code.

Note that the first vulnerability hash incorporated the code branching "if" statement whereas the second did not. While these vulnerabilities are in the same method declaration, they are deemed to be contextually different enough to produce unique vulnerability hashes.

Figure 9:
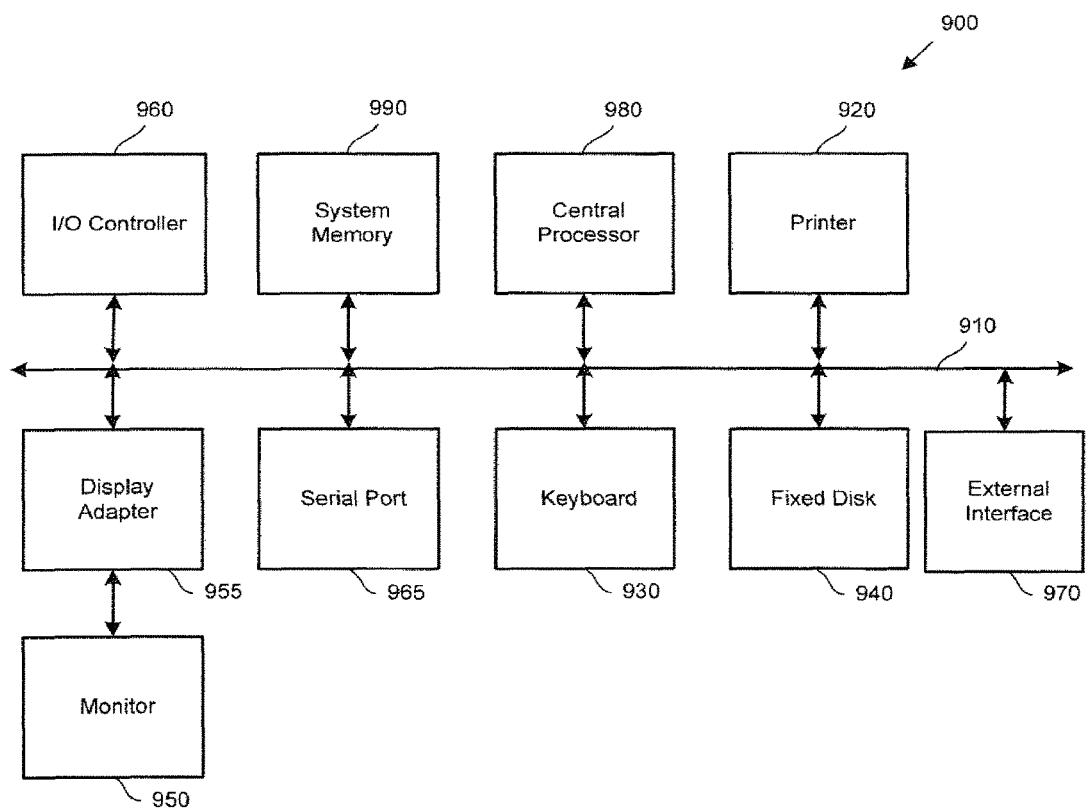
FIG. 9 is a diagram of a computer apparatus according to some embodiments.

FIG. 9 is a diagram of a computer apparatus 900 according to some embodiments. The various elements in the previously described embodiments (e.g., computer system 100) may use any suitable number of subsystems in the computer apparatus to facilitate the functions described herein. Examples of such subsystems or components are shown in FIG. 9. The subsystems shown in FIG. 9 are interconnected via a system bus 910. Additional subsystems such as a printer 920, keyboard 930, fixed disk 940 (or other memory comprising tangible, non-transitory computer-readable media), monitor 950, which is coupled to display adapter 955, and others are shown. Peripherals and input/output (I/O) devices (not shown), which couple to I/O controller 960, can be connected to the computer system by any number of means known in the art, such as serial port 965. For example, serial port 965 or external interface 970 can be used to connect the computer apparatus to a wide area network such as the Internet, a mouse input device, or a scanner. The interconnection via system bus 910 allows the central processor 980 to communicate with each subsystem and to control the execution of instructions from system memory 990 or the fixed disk 940, as well as the exchange of information between subsystems. The system memory 990 and/or the fixed disk 940 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of correlating vulnerabilities across an evolving codebase, comprising:
   generating a representation of computer code, the representation different from the computer code;
   identifying a potential vulnerability during traversal of the representation of the computer code;
   collecting metadata of the potential vulnerability;
   generating a unique vulnerability signature of the potential vulnerability by hashing the metadata of the potential vulnerability;
   correlating the unique vulnerability signature of the potential vulnerability and previously stored vulnerability signatures of potential vulnerabilities to reduce duplicate potential vulnerabilities during the traversal; and
   determining characteristics of the potential vulnerability based on the correlation.

2. The method of claim 1, wherein collecting metadata of the potential vulnerability comprises collecting contextually significant information of the potential vulnerability.

3. The method of claim 2, wherein collecting contextually significant information comprises:
   determining whether the potential vulnerability has a resolved symbol; and
   in response to determining that the potential vulnerability has a resolved symbol, collecting a corresponding qualified signature.

4. The method of claim 2, wherein collecting contextually significant information comprises:
   determining whether the potential vulnerability has a resolved symbol; and
   in response to determining that the potential vulnerability does not have a resolved symbol, determining that a construct of the representation of computer code influences control flow of the computer code.

5. The method of claim 1, wherein the correlating further comprises:
  determining whether the unique vulnerability signature matches any previously stored signatures of potential vulnerability;
  in response to determining that the unique vulnerability signature matches a previously stored signature, characterizing the potential vulnerability as a duplicate; and removing the potential vulnerability.

6. The method of claim 1, wherein the correlating further comprises:
  determining whether the unique vulnerability signature matches any previously stored signatures of potential vulnerability;
  in response to determining that the unique vulnerability does not match a previously stored signature, characterizing the potential as a new vulnerability.

7. The method of claim 1, wherein the representation of the computer code is an abstract syntax tree.

8. A system of correlating vulnerabilities across an evolving codebase, comprising:
  a processor; and
  a memory comprising instructions that when executed by the processor, causes the processor to:
    generate a representation of computer code, the representation different from the computer code;
    identify a potential vulnerability during traversal of the representation of the computer code;
    collect metadata of the potential vulnerability;
    generate a unique vulnerability signature of the potential vulnerability by hashing the metadata of the potential vulnerability;
    correlate the unique vulnerability signature of the potential vulnerability and previously stored vulnerability signatures of potential vulnerabilities to reduce duplicate potential vulnerabilities during the traversal; and
    determine characteristics of the potential vulnerability based on the correlation.

9. The system of claim 8, comprising further instructions, which when executed by the processor causes the processor to collect contextually significant information of the potential vulnerability.

10. The system of claim 9, comprising further instructions, which when executed by the processor causes the processor to:
  determine whether the potential vulnerability has a resolved symbol; and
  in response to the determination that the potential vulnerability has a resolved symbol, collect a corresponding qualified signature.

11. The system of claim 9, comprising further instructions, which when executed by the processor causes the processor to:
  determine whether the potential vulnerability has a resolved symbol; and
  in response to the determination that the potential vulnerability does not have a resolved symbol, determine that a construct of the representation of computer code influences control flow of the computer code.

12. The system of claim 8, comprising further instructions, which when executed by the processor causes the processor to:
  determine whether the unique vulnerability signature matches any previously stored signatures of potential vulnerability;
  in response to the determination that the unique vulnerability signature matches a previously stored signature, characterize the potential vulnerability as a duplicate; and
  remove the potential vulnerability.

13. The system of claim 8, comprising further instructions, which when executed by the processor causes the processor to:
  determine whether the unique vulnerability signature matches any previously stored signatures of potential vulnerability;
  in response to the determination that the unique vulnerability does not match a previously stored signature, characterize the potential as a new vulnerability.

14. The system of claim 8, wherein the representation of the computer code is an abstract syntax tree.

15. A non-transitory computer readable medium storing instructions that when executed by a processor cause the processor to:
  generate a representation of computer code, the representation different from the computer code;
  identify a potential vulnerability during traversal of the representation of the computer code;
  collect metadata of the potential vulnerability;
  generate a unique vulnerability signature of the potential vulnerability by hashing the metadata of the potential vulnerability;
  correlate the unique vulnerability signature of the potential vulnerability and previously stored vulnerability signatures of potential vulnerabilities to reduce duplicate potential vulnerabilities during the traversal; and
  determine characteristics of the potential vulnerability based on the correlation.

16. The non-transitory computer readable medium of claim 15, comprising further instructions, which when executed by the processor causes the processor to collect contextually significant information of the potential vulnerability.

17. The non-transitory computer readable medium of claim 16, comprising further instructions, which when executed by the processor causes the processor to:
  determine whether the potential vulnerability has a resolved symbol; and
  in response to the determination that the potential vulnerability has a resolved symbol, collect a corresponding qualified signature.

18. The non-transitory computer readable medium of claim 16, comprising further instructions, which when executed by the processor causes the processor to:
  determine whether the potential vulnerability has a resolved symbol; and
  in response to the determination that the potential vulnerability does not have a resolved symbol, determine that a construct of the representation of computer code influences control flow of the computer code.

19. The non-transitory computer readable medium of claim 15, comprising further instructions, which when executed by the processor causes the processor to:
  determine whether the unique vulnerability signature matches any previously stored signatures of potential vulnerability;
  in response to the determination that the unique vulnerability signature matches a previously stored signature, characterize the potential vulnerability as a duplicate; and
  remove the potential vulnerability.

20. The non-transitory computer readable medium of claim 15, comprising further instructions, which when executed by the processor causes the processor to:
  determine whether the unique vulnerability signature matches any previously stored signatures of potential vulnerability;
  in response to the determination that the unique vulnerability does not match a previously stored signature, characterize the potential as a new vulnerability.

* * * * *